United States Patent [19]
Hapke et al.

[11] Patent Number: 5,715,843
[45] Date of Patent: Feb. 10, 1998

[54] METHOD OF AND APPARATUS FOR MEASURING THE DIAMETERS OF ROD-SHAPED ARTICLES OF THE TOBACCO PROCESSING INDUSTRY

[75] Inventors: Siegfried Hapke, Geesthacht; Günter Jürgens; Dierk Schröder, both of Hamburg; Uwe Westphal, Lauenburg, all of Germany

[73] Assignee: Hauni Maschinenbau AG, Hamburg, Germany

[21] Appl. No.: 661,668

[22] Filed: Jun. 11, 1996

[30] Foreign Application Priority Data

Jun. 27, 1995 [DE] Germany .................. 195 23 273.9

[51] Int. Cl.⁶ ............................................ G01B 11/10
[52] U.S. Cl. .................... 131/280; 131/308; 356/387; 356/384; 356/385; 209/536
[58] Field of Search ........................ 131/905, 908, 131/281; 209/524, 525, 535, 536, 579, 586, 659; 356/384–387

[56] References Cited

U.S. PATENT DOCUMENTS

| | | |
|---|---|---|
| 3,176,694 | 4/1965 | Kaeding . |
| 4,129,384 | 12/1978 | Walker et al. .................. 356/387 X |
| 4,281,670 | 8/1981 | Heitmann et al. . |
| 4,937,445 | 6/1990 | Leong et al. .................. 356/384 X |
| 5,301,011 | 4/1994 | Hoppe et al. .................. 209/536 X |
| 5,311,291 | 5/1994 | Cholet . |
| 5,392,359 | 2/1995 | Futamura et al. .................. 209/536 X |

FOREIGN PATENT DOCUMENTS

| | | | |
|---|---|---|---|
| 0 359 664 | 3/1990 | European Pat. Off. . | |
| 0555875 | 8/1993 | European Pat. Off. .......... | 131/908 |
| 2219395 | 12/1989 | United Kingdom .......... | 131/908 |
| 2245060 | 12/1991 | United Kingdom .......... | 356/385 |

OTHER PUBLICATIONS

Catalog —Schäfter & Kirchhoff —SK 9630 SK 9635 (1 page), dated Jun. 28, 1994, German language.

*Primary Examiner*—Vincent Millin
*Assistant Examiner*—William J. Deane, Jr.
*Attorney, Agent, or Firm*—Darby & Darby

[57] ABSTRACT

The diameters of successive rod-shaped articles of the tobacco processing industry are ascertained while the articles advance sideways at the periphery of a rotary drum-shaped conveyor and are rotated about their longitudinal axes as a result of frictional engagement with a rolling member which is adjacent the periphery of the conveyor. Successive articles which are being rotated by the rolling member are caused to interrupt a beam of radiation issuing from a laser, either once or more than once, and the amounts of intercepted radiation are indicative of the diameters of the respective articles. Such amounts of intercepted radiation are monitored by a video camera which generates electric signals, and the electric signals are processed into second signals denoting the diameters of discrete successively tested articles and/or the average diameters of series of two or more successively tested articles.

40 Claims, 1 Drawing Sheet

METHOD OF AND APPARATUS FOR MEASURING THE DIAMETERS OF ROD-SHAPED ARTICLES OF THE TOBACCO PROCESSING INDUSTRY

BACKGROUND OF THE INVENTION

The invention relates to the measurement of the diameters of rod-shaped commodities, and more particularly to improvements in methods of and in apparatus for ascertaining the diameters of rod-shaped articles of the tobacco processing industry.

As used herein, the term "rod-shaped articles of the tobacco processing industry" is intended to embrace filter rod sections as well as papyrossy and plain or filter cigarettes, cheroots, cigarillos and cigars.

The diameter of a rod-shaped article of the tobacco processing industry (hereinafter referred to as cigarette or filter cigarette for short) is an important parameter which is indicative of the quality of the cigarette. Therefore, it is customary to monitor the diameters of cigarettes and to carry out all necessary undertakings in order to alter the diameter if the monitored diameter departs from a desired or optimal value. Reference may be had, for example, to published European patent application Serial No. 0 359 664 of Cholet et al. and to U.S. Pat. No. 5,311,291 to Cholet.

A drawback of heretofore known proposals to ascertain the diameters of cigarettes is that such proposals disregard the fact that, in many instances, the outline of the cross-sectional area of a cigarette departs from a truly circular outline. Thus, if one proceeds in accordance with a heretofore known proposal, the ascertained "diameter" is likely to be the major or the minor axis of an ellipse rather than the maximum transverse dimension of a truly circular outline.

OBJECTS OF THE INVENTION

An object of the invention is to provide a novel and improved method of ascertaining the diameters of cigarettes or analogous rod-shaped articles of the tobacco processing industry which is more reliable than heretofore known methods.

Another object of the invention is to provide a method which is not or which need not be more complex than heretofore known methods even though it renders it possible to ascertain the diameters of rod-shaped articles with a degree of accuracy greatly superior to that which can be achieved by resorting to heretofore known methods.

A further object of the invention is to provide a method which renders it possible to ascertain the diameters of rod-shaped articles of the tobacco processing industry without affecting the appearance and/or other desirable characteristics of such articles.

An additional object of the invention is to provide a method which can be practiced in the course of necessary or desirable treatment of rod-shaped articles of the tobacco processing industry so that it does not take up additional time which could involve a reduction of the output of modern high-speed cigarette makers or analogous production lines.

Still another object of the invention is to provide a method which is more versatile than heretofore known methods in that it can be resorted to for the determination of diameters of discrete rod-shaped articles of the tobacco processing industry and/or of groups of successive articles of a long or short series of such articles.

A further object of the invention is to provide a novel and improved apparatus for the practice of the above outlined method.

Another object of the invention is to provide an apparatus which can utilize parts constituting essential or necessary or desirable components of machines or production lines for the mass-production of plain or filter cigarettes or other rod-shaped articles of the tobacco processing industry.

An additional object of the invention is to provide an apparatus which can be incorporated with advantage into existing machines or production lines which are utilized to turn out rod-shaped articles of the tobacco processing industry.

Another object of the invention is to provide an apparatus which can ascertain the transverse dimensions of the outlines of cross-sections of rod-shaped articles of the type wherein the outline of the cross-section departs from a circular outline to a small or very small degree or to a considerable degree.

A further object of the invention is to provide a filter tipping machine which embodies the above outlined apparatus.

An additional object of the invention is to provide a method of making filter cigarettes which embodies the above outlined diameter-ascertaining method.

Still another object of the invention is to provide a novel and improved combination of diameter ascertaining and filter tipping methods.

A further object of the invention is to provide an apparatus which can be utilized for the determination of diameters or average diameters of a succession of discrete rod-shaped articles of the tobacco processing industry and/or for the determination of average diameters of a selected number of successively monitored rod-shaped articles.

SUMMARY OF THE INVENTION

One feature of the instant invention resides in the provision of a method of ascertaining the diameters (actually the maximum or average transverse dimensions of the outlines of cross-sections) of rod-shaped articles of the tobacco processing industry. The improved method comprises the steps of advancing at least one rod-shaped article (such as a plain or filter cigarette or filter rod section) along a predetermined path, rotating the at least one article in the path, directing against the rotating at least one article at least one beam of radiation whereby the at least one article intercepts at least one amount of radiation and such amount of intercepted radiation is indicative of the diameter of the at least one article, monitoring the at least one amount of radiation which has been intercepted by the at least one article and generating electric signals which denote the at least one intercepted amount of radiation, and processing the electric signals into a second signal denoting the diameter of the at least one article.

The advancing step can include continuously or intermittently (i.e., discontinuously) advancing the at least one article along the predetermined path.

The radiation is preferably electromagnetic radiation, e.g., that emitted by a laser (such as a laser diode).

The intercepting step preferably includes intercepting the radiation for at least one short or extremely short interval of time, e.g., an interval of between about 50 and 1000 nsec.

The intercepting step can include repeatedly intercepting the radiation by the at least one article, and the monitoring step then preferably includes monitoring the amounts of radiation which are repeatedly intercepted by the at least one article and generating a plurality of electric signals, one for each of the amounts intercepted by the at least one article.

The advancing step can include advancing at least two but preferably at least three successive articles of a series of articles along the predetermined path, and the rotating step of such method can include causing each of the at least two or three articles to assume an angular position other than the angular position of the other article or articles while an article intercepts the at least one beam of radiation. The processing step of such method can include processing the electric signals which are generated as a result of monitoring the amounts of radiation intercepted by the at least two or at least three articles in such a way that the second signal denotes the average diameters of the at least two or at least three articles.

It is also possible to resort to a monitoring step which includes repeatedly monitoring the amounts of radiation intercepted by one and the same article in different angular positions of such one and the same article so that the second signal denotes the average diameter of the one and the same article.

Alternatively, the monitoring step can include monitoring the amounts of radiation which are intercepted by successive rod-shaped articles of a series of such articles being advanced along the predetermined path so that the second signal denotes the average diameters of the articles of such series.

The radiation is or can be optical (electromagnetic) radiation, and the electric signals can be generated as a result of the monitoring of (a) several amounts of radiation intercepted by a single article and/or (b) at least one amount of radiation intercepted by each of two or more successive articles in a series or file or row of rod-shaped articles being advanced along the predetermined path.

The monitoring step can include employing a video camera, such as a CCD camera.

In accordance with a presently preferred embodiment of the method, the monitoring step can include (a) repeatedly monitoring the amounts of radiation intercepted by one and the same article in different angular positions of such one and the same article and/or (b) monitoring the amounts of radiation which was intercepted by successive articles of a series of rod-shaped articles being advanced along the predetermined path. The processing step of such method can include (i) processing electric signals which denote the amounts of radiation repeatedly intercepted by one and the same article into a second signal denoting an average diameter of the one and the same article, and/or (ii) processing electric signals which denote the amounts of radiation that was intercepted by the successive articles of the series of rod-shaped articles into a second signal which denotes the average diameters of the articles of the series of articles.

The rotating step can include rolling the at least one article by and between two confronting surfaces. One of the confronting surfaces can be provided on a rolling member, and the other of the confronting surfaces can be provided on a rotary drum-shaped conveyor which is moved relative to the rolling member. The rolling member can be stationary or it can be moved at a speed greater or less than the speed of the conveyor.

The at least one article can include a plain cigarette, a filter mouthpiece or filter plug which is coaxial with the plain cigarette, and an adhesive-coated uniting band which is convoluted around and connects the plain cigarette and the filter plug with each other as a result of rotation of the plain cigarette and the filter plug between the confronting surfaces.

The at least one rod-shaped article can intercept several amounts of radiation, and such method (or the processing step of such method) can include the step of comparing with each other electric signals which denote the several amounts of intercepted radiation. The several amounts can include a maximum amount, and the comparing step can include generating a first electric signal which denotes the average or mean of the sum of electric signals denoting the several amounts of intercepted radiation and comparing the first electric signal with an electric signal denoting the maximum amount of intercepted radiation.

Another feature of the invention resides in the provision of an apparatus for the practice of the above outlined method, i.e., an apparatus for ascertaining the diameters of rod-shaped articles of the tobacco processing industry such as filter rod sections and plain or filter cigarettes, cigars, cigarillos and cheroots. The apparatus comprises means for advancing rod-shaped articles along a predetermined path, means for rotating the articles in the path, means for directing at least one beam of radiation against the articles in at least one portion of the path whereby the article in the at least one portion of the path intercepts at least one amount of radiation and such amount is indicative of the diameter of the thus irradiated article, means for monitoring the at least one amount of intercepted radiation and for generating electric signals denoting monitored amounts of radiation, and means for processing the electric signals into second signals denoting the diameters of rod-shaped articles.

The advancing means can comprise means for continuously or discontinuously advancing rod-shaped articles along the predetermined path.

The means for monitoring can include means for monitoring the amounts of radiation for short or extremely short intervals of time, e.g., for intervals of between 50 and 1000 nsec.

The means for directing can include at least one source of electromagnetic radiation, e.g., at least one laser (such as a laser diode). The means for monitoring can include a video camera (such as a CCD camera).

The apparatus can be assembled in such a way that a rod-shaped article rotating in the at least one portion of the predetermined path intercepts several amounts of radiation, and the monitoring means of such apparatus can include means for generating a discrete electric signal for each of the several amounts of intercepted radiation. The processing means of such apparatus can comprise means for generating second signals which denote the average diameters of rod-shaped articles which intercept several amounts of radiation in the at least one portion of the path.

It is also possible to construct and assemble the apparatus in such a way that the monitoring means comprises means for monitoring the amounts of radiation which is intercepted by successive articles of a series of articles rotating seriatim in the at least one portion of the path and while the angular position of an article rotating in the at least one portion of the path deviates from the angular position of the preceding article or articles of the series. The signal processing means of such apparatus can include means for generating a second signal denoting the average diameters of the articles of a portion of or of the entire series.

The means for directing at least one beam of radiation can include a source of a succession or series of short-lasting beams of electromagnetic radiation.

The monitoring means can include means for generating electric signals which denote (a) several amounts of radiation intercepted by a rotating rod-shaped article in the at least one portion of the path and/or (b) amounts of radiation intercepted in the at least one portion of the path by at least two successive articles of a series of articles being advanced along the predetermined path. The signal processing means of such apparatus can include means for processing (i) a plurality of electric signals into a second signal which denotes the average diameter of an article having intercepted several amounts of radiation in the at least one portion of the path and/or (ii) a plurality of electric signals each generated by one of a series of at least two successive articles into a second signal denoting an averaged diameter of the at least two successive articles having intercepted amounts of radiation in the at least one portion of the predetermined path.

The means for rotating can comprise means for rotating rod-shaped articles at least in the at least one portion of the path about the longitudinal axis of the article in such at least one portion of the path.

The processing means can include means for averaging the electric signals.

The means for advancing can comprise a rotary conveyor for the articles, and the means for rotating can include a rolling member which is adjacent the at least one portion of the predetermined path and contacts successive articles of a series of articles being advanced by the conveyor past the rolling member. The conveyor and the rolling member can respectively comprise confronting first and second article-contacting surfaces, and the first surface moves relative to the second surface when the conveyor advances rod-shaped articles past the rolling member. Each rod-shaped article can comprise a plain cigarette, a filter plug which is coaxial with the plain cigarette, and a uniting band which is convoluted around and connects the plain cigarette and the filter plug with each other during advancement along and as a result of contact with the rolling member. The surface of the rolling member can be stationary or can be moved at a speed less than or exceeding the speed of the surface on the conveyor.

The novel features which are considered as characteristic of the invention are set forth in particular in the appended claims. The improved apparatus itself, however, both as to its construction and its mode of operation, together with numerous additional features and advantages thereof, will be best understood upon perusal of the following detailed description of certain presently preferred specific embodiments with reference to the accompanying drawings.

DESCRIPTION OF PREFERRED EMBODIMENTS

Figure 1:
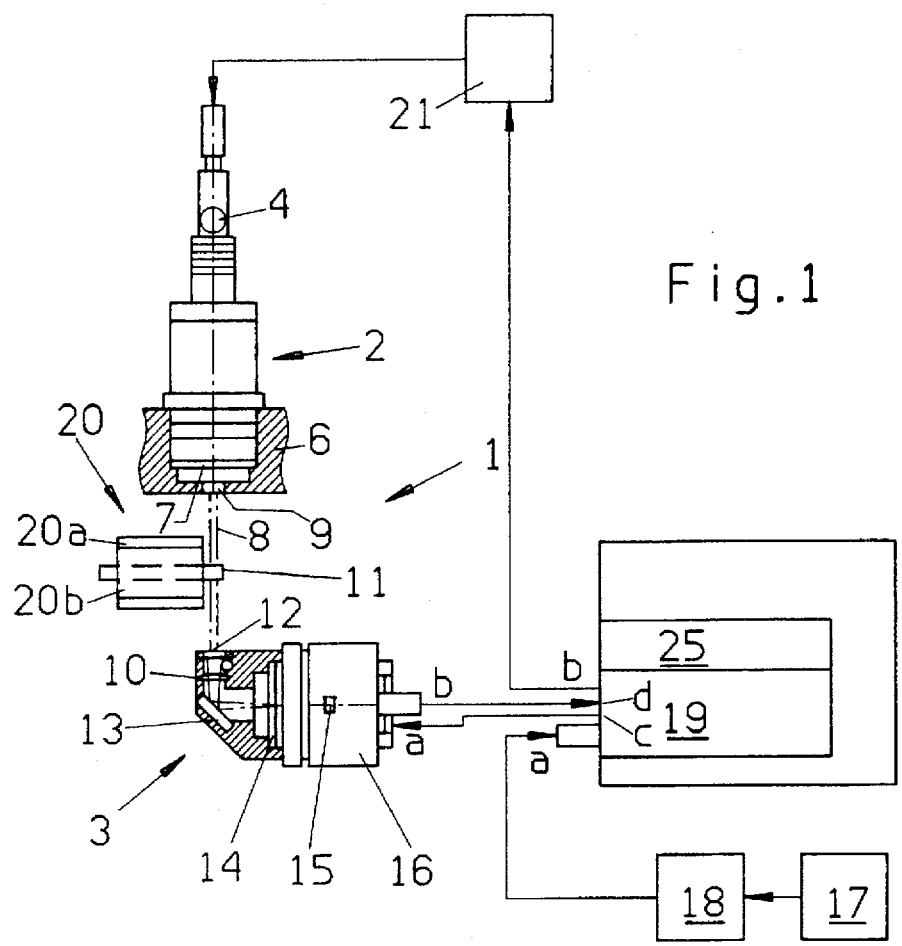
FIG. 1 is a fragmentary partly diagrammatic and partly sectional view of an apparatus which embodies one form of the present invention.

Referring to FIG. 1, there is shown a photoelectric cell 1 including a radiation emitter 2 and a photoelectronic receiver 3. The emitter 2 includes a laser diode pulser 4, e.g., a pulser known as Type LD 65-904 nm distributed by Schäfter & Kirchhoff, Celsiusweg 15, D-22761 Hamburg, Federal Republic Germany. The purpose of the pulser 4 is to emit short-lasting laser light pulses in response to reception of electric exciting impulses from an operational amplifier 21. Electromagnetic radiation (laser light) is emitted by a collimator 6 (e.g., a collimator known as Type SK 9635 distributed by Schäfter & Kirchhoff) having a collimator lens 7 with an outlet 9 for a telecentric curtain or beam 8 of parallel light disposed in a plane which is normal to the plane of FIG. 1. The beam 8 is temporarily intercepted by one end portion of a cigarette 11 which is being advanced sideways (in a direction at right angles to its longitudinal axis) by a combined advancing and rotating system including a drum-shaped rotary conveyor 20a and a stationary or mobile rolling member 20b. The purpose of the apparatus including the structure of FIG. 1 is to ascertain the diameters of successive cigarettes 11 of a series of such cigarettes or other rod-shaped articles of the tobacco processing industry.

Radiation which is not intercepted by a cigarette 11 enters the receiver 3 by way of an inlet 12 and is condensed or bundled by a cylinder lens 10. The thus processed radiation is deflected by a mirror 13 and passes through an optical filter 14 to impinge upon a video camera 16 (e.g., a CCD image sensor known as Type SK 2048JR with 2048 pixel, distributed by Schäfter & Kirchhoff). The array 15 of the camera 16 with the photosensitive elements extends at right angles to the plane of the drawings.

The member 20b cooperates with the conveyor 20a to roll the cigarette 11 about its longitudinal axis while the cigarette advances along that portion of its path wherein it moves along and contacts the adjacent surface of the member 20b. Such surface confronts a surface of the conveyor 20b, and the two surfaces define a channel 20 wherein the cigarette 11 rolls along its axis while being advanced by the conveyor 20a past the rolling member 20b. While advancing through and rolling in the channel 20, the cigarette 11 interrupts the beam 8 once or more than once, depending on the frequency and duration of the impulses furnished by the amplifier 21 to the laser diode 4, and the amounts 26 (see FIG. 2) of radiation which is intercepted by the cigarette 11 are indicative of the diameters (i.e., maximum transverse dimensions) of the outline of the monitored cross-section of such article during advancement through the channel 20.

The conveyor 20a and the rolling member 20b are or can be of the type often employed in filter tipping machines, e.g., in the machines known as MAX distributed by the assignee of the present application. The previously known purpose of the drum-shaped conveyor 20a and of the rolling member 20b (e.g., in a MAX machine which does not embody the improved diameter ascertaining apparatus) is to reliably connect at least one rod-shaped filter mouthpiece or filter plug of unit length or multiple unit length with one or more coaxial plain cigarettes of unit length or multiple unit length by convoluting around portions of such coaxial articles one or more adhesive-coated uniting bands as a result of rolling of the groups of coaxial articles during advancement through the channel 20. That surface of the rolling member 20b which confronts the advancing surface of the conveyor 20a can be stationary or can be moved at a speed greater or less than the speed of the surface of the conveyor 20a, as long as the two confronting surfaces cooperate to effect a rolling of the article or articles 11 in the channel 20. The distance between the confronting rolling surfaces on the conveyor 20a and rolling member 20b is slightly less than the expected diameter of the cigarette 11 in the channel 20.

Those portions of a filter tipping machine which are utilized to effect the wrapping of one or more adhesive-coated uniting bands around two or more coaxial rod-shaped articles of the tobacco processing industry are disclosed, for example, in U.S. Pat. No. 3,176,694 to Kaeding. The disclosure of this patent is incorporated herein by reference. The patent shows that, while moving through the channel between a rotary drum-shaped conveyor and a rolling member, the end portions of the rod-shaped articles extend beyond the channel, and one such end portion is or can be caused to intercept radiation of the beam 8, and the amount (26) of radiation intercepted by an end portion of the article 11 shown in FIG. 1 of the present application is indicative of one diameter (transverse dimension) of the normally circular or substantially circular outline of the monitored cross-section of the article which is caused to rotate about its axis during advancement through the channel 20.

The apparatus of FIG. 1 further comprises a timing pulse generator 17 which controls the operational amplifier 21 to ensure proper timing of the start of transmission of electrical impulses to the laser diode 4 as well as proper sequencing of such impulses irrespective of eventual variations of the operating speed of the filter tipping machine in which the apparatus of FIG. 1 can be put to use. The rate at which the pulse generator 17 transmits pulses to a scanning logic circuit 18 is a function of the operating speed of the filter tipping machine. The circuit 18 transmits a sequence of signals to the input a of a signal processing circuit 19 including a so-called interface card, e.g., a card known as Type SK 9150 [EC] (distributed by Schäfter & Kirchhoff). An output b of the processing circuit 19 transmits excitation signals to the operational amplifier 21 (this amplifier can be an amplifier known as Type SK 9608 B distributed by Schäfter & Kirchhoff).

The logic circuit 18 can be designed in such a way that it initiates ten diameter measurements per one-half of a full revolution of a cigarette 11 in the channel 20 about its own axis. This means that the laser diode 4 emits a flash after each turn of the cigarette 11 in the channel 20 through an angle of approximately 16.5°. The electromagnetic radiation impulses transmitted by the laser diode 4 are very bright and very short, e.g., in the range of between 50 and 1000 nsec, particularly about 300 nsec). The collimator lens 6 of the emitter 2 converts such impulses into narrow curtain-like beams 8.

Radiation which was not intercepted by the rotating cigarette 11 in the channel 20 is condensed by the cylinder lens 10 and is deflected by the mirror 13 to reach the array 15 of the CCD camera 16. The cigarette 11 which rotates in the channel 20 intercepts the amount (26) of radiation which, in the absence of the cigarette in the channel 20, would have impinged upon the array 15 of the camera 16. The output c of the processing circuit (interface card) 19 transmits read-out impulses (e.g., in the form of shifting pulses) to an input a of the camera 16, and the output b of the camera 16 transmits video signals (output signals) to the input d of the processing circuit 19.

Figure 2:
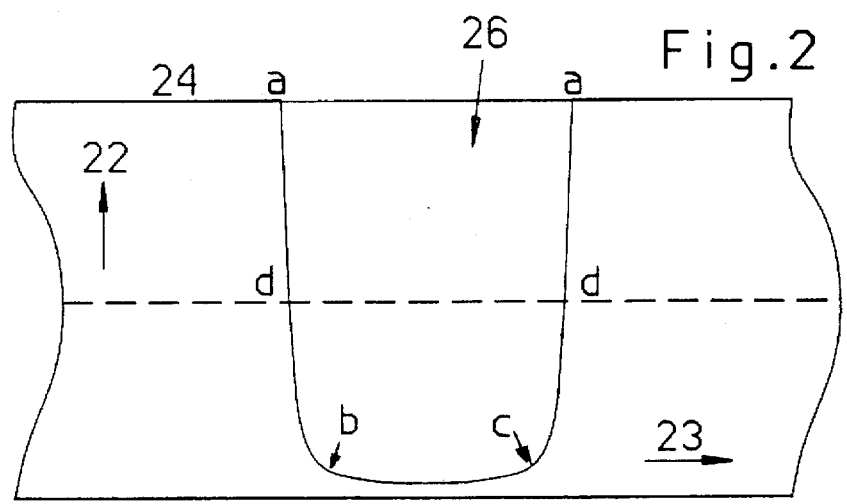
FIG. 2 is a diagram wherein the time is measured along the abscissa and the amounts of radiation being intercepted by rod-shaped articles are measured along the ordinate.

The thus obtained signals 24 (measured along the ordinate 22 as a function of time measured along the abscissa 23) are represented in the diagram of FIG. 2. As can be seen, the intensity of the electric signal 24 drops abruptly at a as a result of interception of the radiation amount 26 by a cigarette 11 which rotates in the channel 20. The intensity of the signal 24 decreases to the minimum value b and begins to rise abruptly at c, when the cigarette 11 has been advanced beyond the beam 8, to reassume its original intensity a. The width of the intercepted amount 26 of radiation is monitored at a selected level, as at d, and the thus obtained information is memorized. The same sequence of steps is repeated after the cigarette 11 which rotates in the channel 20 completes a partial revolution through an angle of approximately 16.5°, i.e., when the amplifier 21 again initiates the emission of a flash by the laser diode 4, and so forth.

The processing circuit 19 memorizes the information pertaining to ten successive determinations of the diameter of the circular or normally circular outline of the monitored cross-section of the cigarette 11 in the channel 20. The thus obtained sum of ten memorized signals is divided by ten to obtain a (second) signal which is indicative of the average diameter of the outline of the monitored or tested cross-section of the cigarette 11. The thus obtained information pertaining to the average diameter of the outline of the tested cross-section is practically independent of (i.e., not influenced by) eventual deformations of portions of the outline of the monitored cross-section.

The tested cigarette 11 is advanced in and beyond the channel 20, and the latter receives a next cigarette of a series of two, three or more successive equidistant cigarettes which are tested one after the other in the same way as described above for the cigarette 11 in the channel 20 of FIG. 1.

The processing circuit 19 of the apparatus shown in FIG. 1 is connected with a regulating or control unit 25, e.g., a computer stage.

The electric signals supplied by the output b of the camera 16 and memorized in the processing circuit 19 can be processed in a number of different ways. For example, the electric signal denoting the maximum amount (26) of radiation intercepted by a cigarette 11 can be compared with the electric signal denoting the minimal amount of intercepted radiation, and the resulting (second) signal is indicative of the maximal deformation of the outline of the monitored cross-section of the tested cigarette 11.

The conveyor 20a is assumed to be driven without interruptions, i.e., the rod-shaped article which has entered the channel 20 is assumed to be continuously rotated about its own axis as a result of simultaneous contact with the surface of the conveyor 20a and the complementary surface of the stationary rolling member 20b. However, it is also within the purview of the invention to rotate the article in the channel 20 at given intervals which alternate with intervals during which the article does not rotate about its axis. The determination of the diameter of the thus manipulated article can take place during the intervals when the article is not rotated about its own axis. Such mode of manipulation of cigarettes 11 or other rod-shaped articles of the tobacco processing industry can be readily achieved by advancing the articles in a manner as disclosed, for example, in U.S. Pat. No. 4,281,670 the disclosure of which is incorporated herein by reference. All that is necessary is to employ a manipulating apparatus which includes a conveyor designed to intermittently transport the articles to be tested, and a rolling member which is caused to roll an article about the longitudinal axis of such article while the article is brought to a halt in the channel or space between the conveyor and the rolling member. The article-contacting surface of the rolling member operating in a manner as disclosed in U.S. Pat. No. 4,281,670 is set in motion so that its effective speed matches the speed of the conveyor and which is caused to move in a direction counter to that of the complementary surface on the conveyor.

Still further, the illustrated apparatus can be utilized to furnish (second) signals which are indicative of the average diameters of a series of two, three or more successively tested rod-shaped articles. The articles can be advanced in a manner as disclosed in connection with FIG. 1 (i.e., in a manner as disclosed in U.S. Pat. No. 3,176,694), in a manner as disclosed in U.S. Pat. No. 4,281,670, or in another suitable way. The articles may be rotated about their longitudinal axes, either continuously or intermittently, and each article can be caused to intercept a beam of radiation, once or more than once, for a relatively short interval of time (e.g., between 50 and 1000 nsec). The monitoring or testing of successive articles of a short or long series of articles takes place while a next-following article is in an angular position other than that of the previously tested article or articles, and each article of the series can be tested once or more than once. Such angular displacement of successively tested articles relative to each other is presently considered to be advisable irrespective of whether each article is tested once or more than once. If each article of the series is tested more than once, the thus obtained electric signals can be processed into second signals denoting the average diameters of the outlines of monitored cross-sections of the respective articles. Alternatively, or in addition to such evaluation of electric signals which are furnished by the camera 16, the apparatus can be designed to process the electric signals in a manner to furnish second signals denoting the average diameters of a short or long series of successively tested articles. It has been found that such method ensures the generation of second signals which are very accurately representative of the diameters of the monitored articles. The reason is believed to be that each of a series of articles is tested several times (always upon a relatively small angular displacement following a preceding monitoring operation) and/or that the angular position of a next-following article during testing is different than that or those of the preceding article or articles.

The apparatus of FIG. 1 employs a system (2, 4, 21) for directing against an article 11 a series of short-lasting beams 8 of electromagnetic radiation. However, it is equally within the spirit of the invention to employ a source which emits an uninterrupted beam of radiation and to provide or utilize the camera 16 or an equivalent camera with a shutter-like arrangement to permit the radiation which is being continuously emitted by a suitable source to reach the camera only at certain intervals, e.g., subsequent to each of two or more angular displacements of a cigarette or another rod-shaped article during traversal of the continuous beam of electromagnetic radiation.

It is also possible to combine the features of the apparatus of FIG. 1 with those of an apparatus employing a CCD camera in combination with a shutter. Thus, the radiation source can emit a series of short-lasting beams or flashes of radiation, and the camera is permitted to receive radiation not intercepted by an article being tested only during the intervals when the shutter is open.

It is further within the purview of the invention to employ an equivalent of electromagnetic (optical) or other suitable radiation, e.g., a flow of a suitable fluid such as air or another gaseous medium. As used in the claims, and unless specifically limited, the term "radiation" is intended to employ electromagnetic and equivalent radiation as well as "radiation" including a flow of a fluid medium.

An important advantage of the improved method and apparatus is that the diameters of selected portions of rod-shaped articles of the tobacco processing industry can be ascertained with a high degree of accuracy and reproducibility and by resorting to a relatively simple and compact apparatus. Moreover, the diameters of substantially circular outlines or the major or minor axes of substantially oval outlines can be ascertained with the same or similar degree of accuracy and reliability.

Another important advantage of the improved method and apparatus is that the method can be practiced while the articles are being treated (such as advanced, rotated and/or otherwise manipulated) for a purpose not related to the determination of the diameters of the articles. Such situation arises if the conveyor 20a and the rolling member 20b are used in a filter tipping machine to perform a useful operation (uniting one or more filter tips with one or more plain cigarettes or the like) in order to produce filter cigarettes, cigars, cigarillos or cheroots of unit length or multiple unit length). Thus, the conveyor 20a and the rolling member 20b can perform their customary functions as well as the function of transporting and rolling rod-shaped articles for the purpose of ascertaining their diameters and/or their cross-sectional outlines.

The signals which are generated by the processing circuit 19 can be displayed and/or utilized to effect some or all of the necessary corrective measures if the ascertained cross-sectional outlines of the tested articles depart from the desired or optimum values.

Without further analysis, the foregoing will so fully reveal the gist of the present invention that others can, by applying current knowledge, readily adapt it for various applications without omitting features that, from the standpoint of prior art, fairly constitute essential characteristics of the above outlined contribution to the art of monitoring rod-shaped articles of the tobacco processing industry and, therefore, such adaptations should and are intended to be comprehended within the meaning and range of equivalence of the appended claims.

What is claimed is:

1. A method of ascertaining the diameters of rod-shaped articles of the tobacco processing industry, comprising the steps of advancing at least one article along a predetermined path; rotating the at least one article in said path; directing against the rotating at least one article at least one beam of radiation whereby the at least one article intercepts at least one amount of radiation which amount is indicative of the diameter thereof; monitoring the at least one amount of radiation intercepted by the at least one article and generating electric signals denoting the at least one intercepted amount of radation at least at one predetermined instant; and processing said electric signals into a second signal denoting the diameter of the at least one article.

2. The method of claim 1, wherein said advancing step includes continuously advancing the at least one article along said predetermined path.

3. The method of claim 1, wherein said advancing step includes intermittently advancing the at least one article along said predetermined path.

4. The method of claim 1, wherein said radiation is electromagnetic radiation.

5. The method of claim 1, wherein said intercepting step includes intercepting radiation by the at least one rotating article for at least one short interval of time.

6. The method of claim 5, wherein the duration of said at least one interval is between 50 and 1000 nsec.

7. The method of claim 1, wherein said intercepting step includes repeatedly intercepting the radiation by the at least one article and said monitoring step includes monitoring the amounts of radiation which are repeatedly intercepted by the at least one article and generating a plurality of electric signals, one for each of the amounts intercepted by the at least one article.

8. The method of claim 1, wherein said advancing step includes advancing at least three successive articles along said predetermined path and said rotating step includes causing each of said at least three articles to assume an angular position other than the angular positions of the other articles while an article intercepts said radiation, said processing step including processing the electric signals generated as a result of monitoring the amounts of radiation intercepted by said at least three articles so that the second signal denotes the average diameters of the at least three articles.

9. The method of claim 1, wherein said monitoring step includes repeatedly monitoring the amounts of radiation intercepted by one and the same article in different angular positions thereof so that said second signal denotes the average diameter of the one and the same article.

10. The method of claim 1, wherein said monitoring step includes monitoring the amounts of radiation intercepted by successive articles of a series of articles being advanced along said predetermined path so that said second signal denotes the average diameters of the articles of said series.

11. The method of claim 1, wherein the radiation is optical radiation and said electric signals are generated as a result of the monitoring of at least one of (a) several amounts of radiation intercepted by a single article and (b) at least one amount of radiation intercepted by each of successive articles of a series of articles being advanced along said predetermined path.

12. The method of claim 1, wherein the radiation is electromagnetic radiation furnished by a laser.

13. The method of claim 1, wherein the radiation is electromagnetic radiation furnished by a laser diode.

14. The method of claim 1, wherein said monitoring step includes utilizing a video camera.

15. The method of claim 11, wherein said monitoring step includes utilizing a CCD camera.

16. The method of claim 1, wherein said monitoring step includes at least one of (a) repeatedly monitoring the amounts of radiation intercepted by one and the same article in different angular positions thereof and (b) monitoring the amounts of radiation intercepted by successive articles of a series of articles being advanced along said predetermined path, said processing step including at least one of (i) processing electric signals denoting the amounts of radiation repeatedly intercepted by the one and the same article into a second signal denoting an average diameter of the one and the same article, and (ii) processing electric signals denoting the amounts of radiation intercepted by the successive articles of the series of articles into a second signal denoting the average diameters of the articles of the series of articles.

17. The method of claim 1, wherein said rotating step includes rolling the at least one article by and between two confronting surfaces.

18. The method of claim 17, wherein one of the confronting surfaces is provided on a rolling member and the other of the confronting surfaces is provided on a rotary drum-shaped conveyor which is moved relative to the rolling member.

19. The method of claim 17, wherein the at least one article includes a plain cigarette, a filter plug coaxial with the plain cigarette, and a uniting band which is convoluted around and connects the plain cigarette and the filter plug with each other as a result of rotation of the plain cigarette and filter plug between the confronting surfaces.

20. The method of claim 1, wherein the at least one article interrupts several amounts of radiation and further comprising the step of comparing with each other electric signals denoting said several amounts.

21. The method of claim 20, wherein said several amounts include a maximum amount and said comparing step includes generating a first electric signal denoting the average of the sum of electric signals denoting said several amounts and comparing said first electric signal with an electric signal denoting said maximum amount.

22. Apparatus for ascertaining the diameters of rod-shaped articles of the tobacco processing industry, comprising means for advancing rod-shaped articles along a predetermined path; means for rotating the articles in said path; means for directing at least one beam of radiation against the articles in at least one portion of said path whereby the article in said at least one portion of said path intercepts at least one amount of radiation which is indicative of the diameter of the irradiated article; means for monitoring the at least one amount of intercepted radiation and for generating electric signals denoting monitored amounts of radiation at least at one predetermined instant; and means for processing said electric signals into second signals denoting the diameters of rod-shaped articles.

23. The apparatus of claim 22, wherein said means for advancing comprises means for continuously advancing rod-shaped articles along said predetermined path.

24. The apparatus of claim 22, wherein said means for advancing comprises means for discontinuously advancing rod-shaped articles along said path.

25. The apparatus of claim 22, wherein said means for monitoring includes means for monitoring the amounts of radiation for short intervals of time.

26. The apparatus of claim 25, wherein the duration of said intervals is between 50 and 1000 nsec.

27. The apparatus of claim 22, wherein said means for directing includes at least one source of electromagnetic radiation.

28. The apparatus of claim 22, wherein the rod-shaped article rotating in said at least one portion of said path intercepts several amounts of radiation and said monitoring means includes means for generating a discrete electric signal for each of said several amounts of intercepted radiation, said means for processing comprising means for generating second signals denoting the average diameters of articles which intercept several amounts of radiation in said at least one portion of said path.

29. The apparatus of claim 22, wherein said monitoring means comprises means for monitoring the amounts of radiation intercepted by successive articles of a series of articles rotating in said at least one portion of said path and while the angular position of an article rotating in said at least one portion of said path deviates from the angular position of the preceding article or articles of the series, said means for processing including means for generating a second signal denoting the average diameters of the articles of the series.

30. The apparatus of claim 22, wherein said means for directing includes a source of a succession of short-lasting beams of electromagnetic radiation.

31. The apparatus of claim 22, wherein said monitoring means includes means for generating electric signals denoting at least one of (a) several amounts of radiation intercepted by a rotating article in said at least one portion of said path and (b) amounts of radiation intercepted in said at least one portion of said path by at least two successive articles being advanced along said path, said means for processing including means for processing at least one of (i) a plurality of electric signals into a second signal denoting the average diameter of an article having intercepted several amounts of radiation in said at least one portion of said path and (ii) a plurality of electric signals each generated by one of a series of at least two successive articles into a second signal denoting an averaged diameter of said at least two successive articles having intercepted radiation in said at least one portion of said path.

32. The apparatus of claim 22, wherein said means for rotating comprises means for rotating rod-shaped articles at least in said at least one portion of said path about the longitudinal axis of the article.

33. The apparatus of claim 22, wherein said means for directing includes at least one laser.

34. The apparatus of claim 22, wherein said means for directing includes at least one laser diode.

35. The apparatus of claim 22, wherein said means for monitoring comprises a video camera.

36. The apparatus of claim 22, wherein said means for directing comprises a CCD camera.

37. The apparatus of claim 22, wherein said processing means comprises means for averaging said electric signals.

38. The apparatus of claim 22, wherein said means for advancing comprises a rotary conveyor for the articles and said means for rotating includes a rolling member adjacent said at least one portion of said path and contacting successive articles of a series of articles being advanced by said conveyor past said rolling member.

39. The apparatus of claim 38, wherein said conveyor and said rolling member respectively comprise confronting first and second article-contacting surfaces and said first surface moves relative to said second surface when said conveyor advances articles past said rolling member.

40. The apparatus of claim 38, wherein each rod-shaped article includes a plain cigarette, a filter plug coaxial with the plain cigarette, and a uniting band which is convoluted around and connects the plain cigarette and the filter plug with each other during advancement along and as a result of contact with said rolling member.

\* \* \* \* \*